United States Patent
Jeon et al.

(10) Patent No.: US 12,445,327 B2
(45) Date of Patent: Oct. 14, 2025

(54) METHOD AND APPARATUS FOR TRANSCEIVING AND RECEIVING WIRELESS SIGNAL IN WIRELESS COMMUNICATION SYSTEM

(71) Applicant: LG ELECTRONICS INC., Seoul (KR)

(72) Inventors: Kijun Jeon, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 444 days.

(21) Appl. No.: 17/800,042

(22) PCT Filed: Feb. 24, 2020

(86) PCT No.: PCT/KR2020/002607
§ 371 (c)(1),
(2) Date: Aug. 16, 2022

(87) PCT Pub. No.: WO2021/172601
PCT Pub. Date: Sep. 2, 2021

(65) Prior Publication Data
US 2023/0082053 A1 Mar. 16, 2023

(51) Int. Cl.
*H04L 25/02* (2006.01)
(52) U.S. Cl.
CPC ........ *H04L 25/024* (2013.01); *H04L 25/0224* (2013.01)
(58) Field of Classification Search
None
See application file for complete search history.

(56) References Cited

U.S. PATENT DOCUMENTS

| | | | |
|---|---|---|---|
| 2009/0052427 A1* | 2/2009 | Oketani | H04L 5/0007 370/347 |
| 2015/0071242 A1* | 3/2015 | Vilaipornsawai | H04L 25/03343 370/330 |
| 2019/0049500 A1* | 2/2019 | Subramania | B64D 45/02 |
| 2020/0280927 A1* | 9/2020 | Charipadi | H04W 52/241 |
| 2020/0293896 A1* | 9/2020 | Kwon | G06N 3/045 |
| 2021/0084601 A1* | 3/2021 | Rofougaran | G06N 3/045 |
| 2021/0099207 A1* | 4/2021 | Mao | H04L 25/03891 |

FOREIGN PATENT DOCUMENTS

| | | |
|---|---|---|
| KR | 1020120080605 A | 7/2012 |
| WO | 2017135693 A1 | 8/2017 |
| WO | 2018174690 A2 | 9/2018 |
| WO | 2018203592 A1 | 11/2018 |

OTHER PUBLICATIONS

Ericsson, "DMRS design for two-port PSSCH transmission", 3GPP TSG RAN WG1 Meeting #92bis, Apr. 16-20, 2018, R1-1804635.

* cited by examiner

*Primary Examiner* — Adnan Baig
(74) *Attorney, Agent, or Firm* — BRYAN CAVE LEIGHTON PAISNER LLP

(57) ABSTRACT

According to the present document, a method by which a terminal receives data in a wireless communication system comprises: receiving a channel signal and a reference signal (RS) from a base station; generating a sequence by performing an operation of equalizing the RS to a channel RS; and decoding the received channel signal on the basis of the generated sequence, wherein the operation of equalizing the RS to the channel RS is based on a parameter determined according to a machine learning process.

3 Claims, 13 Drawing Sheets

METHOD AND APPARATUS FOR TRANSCEIVING AND RECEIVING WIRELESS SIGNAL IN WIRELESS COMMUNICATION SYSTEM

This application is the National Stage filing under 35 U.S.C. 371 of International Application No. PCT/KR2020/002607, filed on Feb. 24, 2020, the contents of which are all hereby incorporated by reference herein in their entirety.

TECHNICAL FIELD

The present disclosure relates to a method and apparatus for transmitting and receiving data in a wireless communication system and, more particularly, to a method of detecting and receiving data based on machine learning and an apparatus supporting the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system and a single carrier frequency division multiple access (SC-FDMA) system.

In addition, the present document may be related to the following technical configurations.

<Artificial Intelligence (AI)>

AI refers to a field that studies artificial intelligence or methodology capable of achieving artificial intelligence. Machine learning refers to a field that defines various problems handled in the AI field and studies methodology for solving the problems. Machine learning may also be defined as an algorithm for raising performance for any task through steady experience of the task.

An artificial neural network (ANN) may refer to a model in general having problem solving capabilities, that is composed of artificial neurons (nodes) constituting a network by a combination of synapses, as a model used in machine learning. The ANN may be defined by a connection pattern between neurons of different layers, a learning process of updating model parameters, and/or an activation function for generating an output value.

The ANN may include an input layer, an output layer, and, optionally, one or more hidden layers. Each layer includes one or more neurons and the ANN may include a synapse connecting neurons. In the ANN, each neuron may output input signals, which are input through the synapse, weights, and function values of an activation function for deflection.

A model parameter refers to a parameter determined through learning and includes a weight of synaptic connection and a deflection of a neuron. A hyperparameter refers to a parameter that should be configured before learning in a machine learning algorithm and includes a learning rate, the number of repetitions, a mini batch size, an initialization function, and the like.

The purpose of learning of the ANN may be understood as determining the model parameter that minimizes a loss function. The loss function may be used as an index to determine an optimal model parameter in a learning process of the ANN.

Machine learning may be classified into supervised learning, unsupervised learning, and reinforcement learning, according to a learning scheme.

Supervised learning refers to a method of training the ANN in a state in which a label for training data is given. The label may represent a correct answer (or result value) that the ANN should infer when the training data is input to the ANN. Unsupervised learning may refer to a method of training the ANN in a state in which the label for the training data is not given. Reinforcement learning may refer to a learning method in which an agent defined in a certain environment is trained to select a behavior or a behavior order that maximizes accumulative compensation in each state.

Among ANNs, machine learning implemented as a deep neural network (DNN) including a plurality of hidden layers is also called deep learning. Deep learning is a part of machine learning. Hereinbelow, machine learning includes deep learning.

DISCLOSURE

Technical Problem

The present document relates to a method and apparatus for detecting and receiving data based on machine learning. More specifically, the present disclosure relates to a method and apparatus for efficiently detecting data based on a DNN-based preprocessor-aided multiple input multiple output (MIMO) detector.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure relates to a method of receiving data in a wireless communication system and apparatuses supporting the same.

According to an aspect of the present disclosure, provided herein is a method of receiving data by a user equipment in a wireless communication system, including receiving a channel signal and a reference signal (RS) from a base station; performing an operation of equalizing the RS based on a channel RS to generate a sequence; and decoding the received channel signal based on the generated sequence. The equalizing the RS based on the channel RS is based on a parameter determined according to a machine learning process.

In another aspect of the present disclosure, provided herein is a user equipment for receiving data in a wireless communication system, including a receiver; a transmitter; and a processor. The receiver receives a channel signal and a reference signal (RS) from a base station, and the processor performs an operation of equalizing the RS based on a channel RS to generate a sequence and decodes the received channel signal based on the generated sequence. The equalizing the RS based on the channel RS is based on a parameter determined according to a machine learning process.

In another aspect of the present disclosure, provided herein is a method of receiving data by a base station in a wireless communication system, including receiving a channel signal and a reference signal (RS) from a user equipment; performing an operation of equalizing the RS based on a channel RS to generate a sequence; and decoding the received channel signal based on the generated sequence. The equalizing the RS based on the channel RS is based on a parameter determined according to a machine learning process.

In another aspect of the present disclosure, provided herein is a base station for receiving data in a wireless communication system, including a receiver; a transmitter; and a processor. The receiver receives a channel signal and a reference signal (RS) from the base station, and the processor performs an operation of equalizing the RS based on a channel RS to generate a sequence and decodes the received channel signal based on the generated sequence. The equalizing the RS based on the channel RS is based on a parameter determined according to a machine learning process.

In another aspect of the present disclosure, provided herein is an apparatus for a user equipment, including at least one processor; and at least one computer memory operably connectable to the at least one processor and storing instructions that, when executed, cause the at least one processor to perform operations. The operations include receiving a channel signal and a reference signal (RS) from a base station, performing an operation of equalizing the RS based on a channel RS to generate a sequence; and decoding the received channel signal based on the generated sequence. The equalizing the RS based on the channel RS is based on a parameter determined according to a machine learning process.

In another aspect of the present disclosure, provided herein is a computer readable storage medium storing at least one computer program including instructions that, when executed by at least one processor, cause the at least one processor to perform operations for a user equipment. The operations include receiving a channel signal and a reference signal (RS) from a base station; performing an operation of equalizing the RS based on a channel RS to generate a sequence; and decoding the received channel signal based on the generated sequence. The equalizing the RS based on the channel RS is based on a parameter determined according to a machine learning process.

The machine learning process for determining the parameter may include determining the parameter by repeating the following processes a predetermined number of times: (1) outputting a parameter using the received channel signal and the RS as an input, (2) updating a parameter using the output parameter and the received channel signal as an input, and (3) re-updating a parameter using the parameter updated according to the process of (2) and the received channel signal as an input.

The decoding the received channel signal may include performing a second machine learning process using the determined parameter as an input; and determining a second parameter according to the second machine learning process and may be based on the determined second parameter.

The method may further include performing zero-forcing (ZF) filtering prior to performing the operation.

The machine learning process may be based on a deep neural network (DNN).

The machine learning process may include generating a second channel signal by performing matched filtering upon the received channel signal, and the generated second channel signal may be used as an input.

The RS may be a demodulation reference signal (DMRS).

The above-described aspects of the present disclosure are merely a part of exemplary embodiments of the present disclosure and various embodiments into which technical features are incorporated may be derived and understood by persons skilled in the art from the following detailed description of the present disclosure.

Advantageous Effects

According to the present disclosure, a receiver including a learning-based MIMO detector with optimal performance may be configured irrespective of channel variation.

According to the present disclosure, offline learning may be performed using a fixed neural network irrespective of channel variation by use of a DNN-based preprocessor-aided MIMO detector.

According to the present disclosure, an implementable MIMO detector with optimal performance may be designed even when the number of antennas and the number of users increase.

It will be appreciated by persons skilled in the art that the effects that could be achieved with the present disclosure are not limited to what has been particularly described hereinabove and other advantages of the present disclosure will be more clearly understood from the following detailed description.

BRIEF DESCRIPTION OF DRAWINGS

The accompanying drawings, which are included to provide a further understanding of the disclosure, provide embodiments of the present disclosure together with detail explanation.

BEST MODE

Figure 1A:
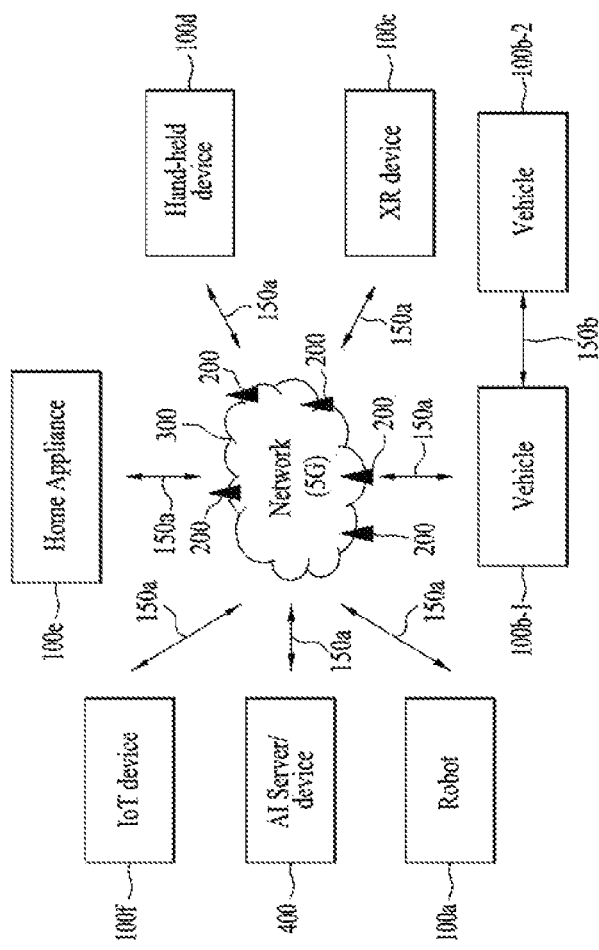
FIG. 1A illustrates a communication system applied to the present disclosure.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE and LTE-A system, the following descriptions are applicable to other random mobile communication systems in a manner of excluding unique features of the 3GPP LTE and LTE-A. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this document, downlink (DL) communication refers to communication from a base station (BS) to a user equipment (UE), and uplink (UL) communication refers to communication from the UE to the BS. In DL, a transmitter may be a part of the BS and a receiver may be a part of the UE. In UL, a transmitter may be a part of the UE and a receiver may be a part of the BS. Herein, the BS may be referred to as a first communication device, and the UE may be referred to as a second communication device. The term 'BS' may be replaced with 'fixed station', 'Node B', 'evolved Node B (eNB)', 'next-generation node B (gNB)', 'base transceiver system (BTS)', 'access point (AP)', 'network node', 'fifth-generation (5G) network node', 'artificial intelligence (AI) system', 'road side unit (RSU)', 'robot', etc. The term 'UE' may be replaced with 'terminal', 'mobile station (MS)', 'user terminal (UT)', 'mobile subscriber station (MSS)', 'subscriber station (SS)', 'advanced mobile station (AMS)', 'wireless terminal (WT)', 'machine type communication (MTC) device', 'machine-to-machine (M2M) device', 'device-to-device (D2D) device', 'vehicle', 'robot', 'AI module', etc.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Although the present disclosure is described based on 3GPP communication systems (e.g., LTE-A, NR, etc.) for clarity of description, the spirit of the present disclosure is not limited thereto. LTE refers to technologies beyond 3GPP technical specification (TS) 36.xxx Release 8. In particular, LTE technologies beyond 3GPP TS 36.xxx Release 10 are referred to as LTE-A, and LTE technologies beyond 3GPP TS 36.xxx Release 13 are referred to as LTE-A pro. 3GPP NR refers to technologies beyond 3GPP TS 38.xxx Release 15. LTE/NR may be called '3GPP system'. Herein, "xxx" refers to a standard specification number.

In the present disclosure, a node refers to a fixed point capable of transmitting/receiving a radio signal for communication with a UE. Various types of BSs may be used as the node regardless of the names thereof. For example, the node may include a BS, a node B (NB), an eNB, a pico-cell eNB (PeNB), a home eNB (HeNB), a relay, a repeater, etc. A device other than the BS may be the node. For example, a radio remote head (RRH) or a radio remote unit (RRU) may be the node. The RRH or RRU generally has a lower power level than that of the BS. At least one antenna is installed for each node. The antenna may refer to a physical antenna or mean an antenna port, a virtual antenna, or an antenna group. The node may also be referred to as a point.

In the present disclosure, a cell refers to a prescribed geographical area in which one or more nodes provide communication services or a radio resource. When a cell refers to a geographical area, the cell may be understood as the coverage of a node where the node is capable of providing services using carriers. When a cell refers to a radio resource, the cell may be related to a bandwidth (BW), i.e., a frequency range configured for carriers. Since DL coverage, a range within which the node is capable of transmitting a valid signal, and UL coverage, a range within which the node is capable of receiving a valid signal from the UE, depend on carriers carrying the corresponding signals, the coverage of the node may be related to the coverage of the cell, i.e., radio resource used by the node. Accordingly, the term "cell" may be used to indicate the service coverage of a node, a radio resource, or a range to which a signal transmitted on a radio resource can reach with valid strength.

In the present disclosure, communication with a specific cell may mean communication with a BS or node that provides communication services to the specific cell. In addition, a DL/UL signal in the specific cell refers to a DL/UL signal from/to the BS or node that provides communication services to the specific cell. In particular, a cell providing DL/UL communication services to a UE may be called a serving cell. The channel state/quality of the specific cell may refer to the channel state/quality of a communication link formed between the BS or node, which provides communication services to the specific cell, and the UE.

When a cell is related to a radio resource, the cell may be defined as a combination of DL and UL resources, i.e., a combination of DL and UL component carriers (CCs). The cell may be configured to include only DL resources or a combination of DL and UL resources. When carrier aggregation is supported, a linkage between the carrier frequency of a DL resource (or DL CC) and the carrier frequency of a UL resource (or UL CC) may be indicated by system information transmitted on a corresponding cell. The carrier frequency may be equal to or different from the center frequency of each cell or CC. A cell operating on a primary frequency may be referred to as a primary cell (PCell) or PCC, and a cell operating on a secondary frequency may be referred to as a secondary cell (SCell) or SCC. The SCell may be configured after the UE and BS establish a radio resource control (RRC) connection therebetween by performing an RRC connection establishment procedure, that is, after the UE enters the RRC_CONNECTED state. The RRC connection may mean a path that enables the RRC of the UE and the RRC of the BS to exchange an RRC message. The SCell may be configured to provide additional radio resources to the UE. The SCell and the PCell may form a set of serving cells for the UE depending on the capabilities of the UE. When the UE is not configured with carrier aggregation or does not support the carrier aggregation although the UE is in the RRC_CONNECTED state, only one serving cell configured with the PCell exists.

A cell supports a unique radio access technology (RAT). For example, transmission/reception in an LTE cell is performed based on the LTE RAT, and transmission/reception in a 5G cell is performed based on the 5G RAT.

The carrier aggregation is a technology for combining a plurality of carriers each having a system BW smaller than a target BW to support broadband. The carrier aggregation is different from O1-DMA in that in the former, DL or UL communication is performed on a plurality of carrier frequencies each forming a system BW (or channel BW) and in the latter, DL or UL communication is performed by dividing a base frequency band into a plurality of orthogonal subcarriers and loading the subcarriers in one carrier frequency. For example, in OFDMA or orthogonal frequency division multiplexing (OFDM), one frequency band with a predetermined system BW is divided into a plurality of subcarriers with a predetermined subcarrier spacing, and information/data is mapped to the plurality of subcarriers. Frequency up-conversion is applied to the frequency band to which the information/data is mapped, and the information/data is transmitted on the carrier frequency in the frequency band. In wireless carrier aggregation, multiple frequency bands, each of which has its own system BW and carrier frequency, may be simultaneously used for communication, and each frequency band used in the carrier aggregation may be divided into a plurality of subcarriers with a predetermined subcarrier spacing.

3GPP communication specifications define DL physical channels corresponding to resource elements carrying information originating from higher (upper) layers of physical layers (e.g., a medium access control (MAC) layer, a radio link control (RLC) layer, a protocol data convergence protocol (PDCP) layer, an RRC layer, a service data adaptation protocol (SDAP) layer, a non-access stratum (NAS) layer, etc.) and DL physical signals corresponding to resource elements which are used by physical layers but do not carry information originating from higher layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), which is called a pilot signal, refers to a predefined signal with a specific waveform known to both the BS and UE. For example, a cell-specific RS (CRS), a UE-specific RS (UE-RS), a positioning RS (PRS), a channel state information RS (CSI-RS), and a demodulation reference signal (DMRS) may be defined as DL RSs. In addition, the 3GPP communication specifications define UL physical channels corresponding to resource elements carrying information originating from higher layers and UL physical signals corresponding to resource elements which are used by physical layers but do not carry information originating from higher layers. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signals.

In the present disclosure, the PDCCH and the PDSCH may refer to a set of time-frequency resources or resource elements carrying downlink control information (DCI) of the physical layer and a set of time-frequency resources or resource elements carrying DL data thereof, respectively. The PUCCH, the PUSCH, and the PRACH may refer to a set of time-frequency resources or resource elements carrying uplink control information (UCI) of the physical layer, a set of time-frequency resources or resource elements carrying UL data thereof, and a set of time-frequency resources or resource elements carrying random access signals thereof, respectively. When it is said that a UE transmits a UL physical channel (e.g., PUCCH, PUSCH, PRACH, etc.), it may mean that the UE transmits DCI, UL data, or a random access signal on or over the corresponding UL physical channel. When it is said that the BS receives a UL physical channel, it may mean that the BS receives DCI, UL data, a random access signal on or over the corresponding UL physical channel. When it is said that the BS transmits a DL physical channel (e.g., PDCCH, PDSCH, etc.), it may mean that the BS transmits DCI or UL data on or over the corresponding DL physical channel. When it is said that the UE receives a DL physical channel, it may mean that the UE receives DCI or UL data on or over the corresponding DL physical channel.

In the present disclosure, a transport block may mean the payload for the physical layer. For example, data provided from the higher layer or MAC layer to the physical layer may be referred to as the transport block.

In the present disclosure, hybrid automatic repeat request (HARQ) may mean a method used for error control. A HARQ acknowledgement (HARQ-ACK) transmitted in DL is used to control an error for UL data, and a HARQ-ACK transmitted in UL is used to control an error for DL data. A transmitter that performs the HARQ operation waits for an ACK signal after transmitting data (e.g. transport blocks or codewords). A receiver that performs the HARQ operation transmits an ACK signal only when the receiver correctly receives data. If there is an error in the received data, the receiver transmits a negative ACK (NACK) signal. Upon receiving the ACK signal, the transmitter may transmit (new) data but, upon receiving the NACK signal, the transmitter may retransmit the data. Meanwhile, there may be a time delay until the BS receives ACK/NACK from the UE and retransmits data after transmitting scheduling information and data according to the scheduling information. The time delay occurs due to a channel propagation delay or a time required for data decoding/encoding. Accordingly, if new data is transmitted after completion of the current HARQ process, there may be a gap in data transmission due to the time delay. To avoid such a gap in data transmission during the time delay, a plurality of independent HARQ processes are used. For example, when there are 7 transmission occasions between initial transmission and retransmission, a communication device may perform data transmission with no gap by managing 7 independent HARQ processes. When the communication device uses a plurality of parallel HARQ processes, the communication device may successively perform UL/DL transmission while waiting for HARQ feedback for previous UL/DL transmission.

In the present disclosure, channel state information (CSI) collectively refers to information indicating the quality of a radio channel (also called a link) created between a UE and an antenna port. The CSI includes at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

For the background technology, terminology, and abbreviations used in the present disclosure, reference may be made to standard specifications published before the present disclosure. For example, reference may be made to the following documents.

3GPP LTE
3GPP TS 36.211: Physical channels and modulation
3GPP TS 36.212: Multiplexing and channel coding
3GPP TS 36.213: Physical layer procedures
3GPP TS 36.214: Physical layer; Measurements
3GPP TS 36.300: Overall description
3GPP TS 36.304: User Equipment (UE) procedures in idle mode
3GPP TS 36.314: Layer 2—Measurements
3GPP TS 36.321: Medium Access Control (MAC) protocol
3GPP TS 36.322: Radio Link Control (RLC) protocol
3GPP TS 36.323: Packet Data Convergence Protocol (PDCP)
3GPP TS 36.331: Radio Resource Control (RRC) protocol
3GPP TS 23.303: Proximity-based services (Prose); Stage 2
3GPP TS 23.285: Architecture enhancements for V2X services
3GPP TS 23.401: General Packet Radio Service (GPRS) enhancements for Evolved Universal Terrestrial Radio Access Network (E-UTRAN) access
3GPP TS 23.402: Architecture enhancements for non-3GPP accesses
3GPP TS 23.286: Application layer support for V2X services; Functional architecture and information flows
3GPP TS 24.301: Non-Access-Stratum (NAS) protocol for Evolved Packet System (EPS); Stage 3
3GPP TS 24.302: Access to the 3GPP Evolved Packet Core (EPC) via non-3GPP access networks; Stage 3
3GPP TS 24.334: Proximity-services (ProSe) User Equipment (UE) to ProSe function protocol aspects; Stage 3
3GPP TS 24.386: User Equipment (UE) to V2X control function; protocol aspects; Stage 3
3GPP NR
3GPP TS 38.211: Physical channels and modulation
3GPP TS 38.212: Multiplexing and channel coding
3GPP TS 38.213: Physical layer procedures for control
3GPP TS 38.214: Physical layer procedures for data
3GPP TS 38.215: Physical layer measurements
3GPP TS 38.300: NR and NG-RAN Overall Description
3GPP TS 38.304: User Equipment (UE) procedures in idle mode and in RRC inactive state
3GPP TS 38.321: Medium Access Control (MAC) protocol
3GPP TS 38.322: Radio Link Control (RLC) protocol
3GPP TS 38.323: Packet Data Convergence Protocol (PDCP)
3GPP TS 38.331: Radio Resource Control (RRC) protocol
3GPP TS 37.324: Service Data Adaptation Protocol (SDAP)
3GPP TS 37.340: Multi-connectivity; Overall description
3GPP TS 23.287: Application layer support for V2X services; Functional architecture and information flows
3GPP TS 23.501: System Architecture for the 5G System
3GPP TS 23.502: Procedures for the 5G System
3GPP TS 23.503: Policy and Charging Control Framework for the 5G System; Stage 2
3GPP TS 24.501: Non-Access-Stratum (NAS) protocol for 5G System (5GS); Stage 3
3GPP TS 24.502: Access to the 3GPP 5G Core Network (SGCN) via non-3GPP access networks
3GPP TS 24.526: User Equipment (UE) policies for 5G System (5GS); Stage 3

NR Radio Access

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the present disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

The numerology corresponds to one subcarrier spacing in the frequency domain. Different numerologies may be defined by scaling a reference subcarrier spacing to an integer N.

FIG. 1A illustrates a communication system applied to the present disclosure.

Referring to FIG. 1A, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head- Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 1B:
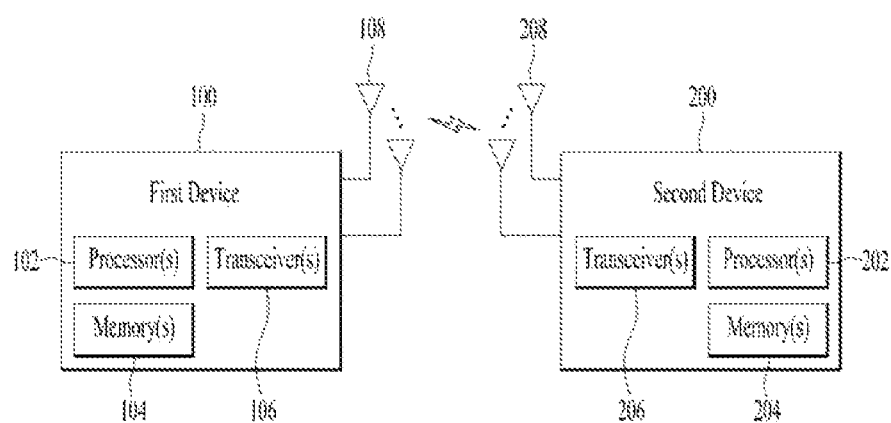
FIG. 1B illustrates wireless devices applicable to the present disclosure.

FIG. 1B illustrates wireless devices applicable to the present disclosure.

Referring to FIG. 1B, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 1A.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present invention, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present invention, the wireless device may represent a communication modem/circuit/chip.

The first wireless device 100 and/or the second wireless device 200 may include a single antenna and multiple antennas. If at least one of the first wireless device 100 or the second wireless device 200 includes multiple antennas, a wireless communication system may be called a multiple input multiple output (MIMO) system.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 1C:
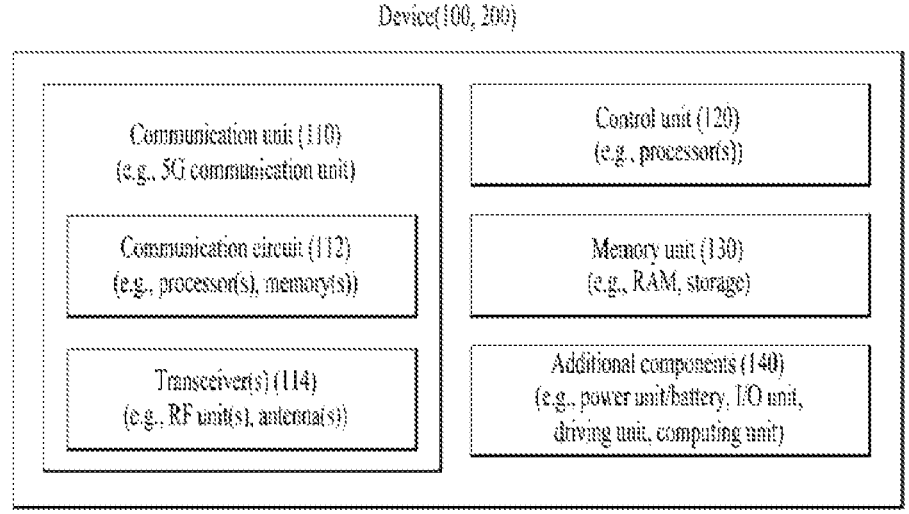
FIG. 1C illustrates another example of a wireless device applied to the present disclosure.

FIG. 1C illustrates another example of a wireless device applied to the present disclosure.

The wireless device may be implemented in various forms according to a use-case/service (refer to FIG. 1A).

Referring to FIG. 1C, wireless devices 100 and 200 may correspond to the wireless devices 100 and 200 of FIG. 1B and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 1B. For example, the transceiver(s) 114 may include the one or more transceivers 106 and 206 and/or the one or more antennas 108 and 208 of FIG. 1B. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (110) unit, a driving unit, and a computing unit. The wireless device may be implemented in the form of, without being limited to, the robot (100a of FIG. 1A), the vehicles (100b-1 and 100b-2 of FIG. 1A), the XR device (100c of FIG. 1A), the hand-held device (100d of FIG. 1A), the home appliance (100e of FIG. 1A), the IoT device (100f of FIG. 1A), a digital broadcast terminal, a hologram device, a public safety device, an MTC device, a medicine device, a fintech device (or a finance device), a security device, a climate/environment device, the AI server/device (400 of FIG. 1A), the BSs (200 of FIG. 1A), a network node, etc. The wireless device may be used in a mobile or fixed place according to a use-example/ service.

In FIG. 1C, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

An apparatus for transmitting data based on a machine learning process according to the present disclosure may include a transceiver; a memory; and at least one processor connected to the transceiver and the memory.

The memory may be configured to store instructions that, when executed by the at least one processor, cause the at least one processor to perform operations.

Figure 2:
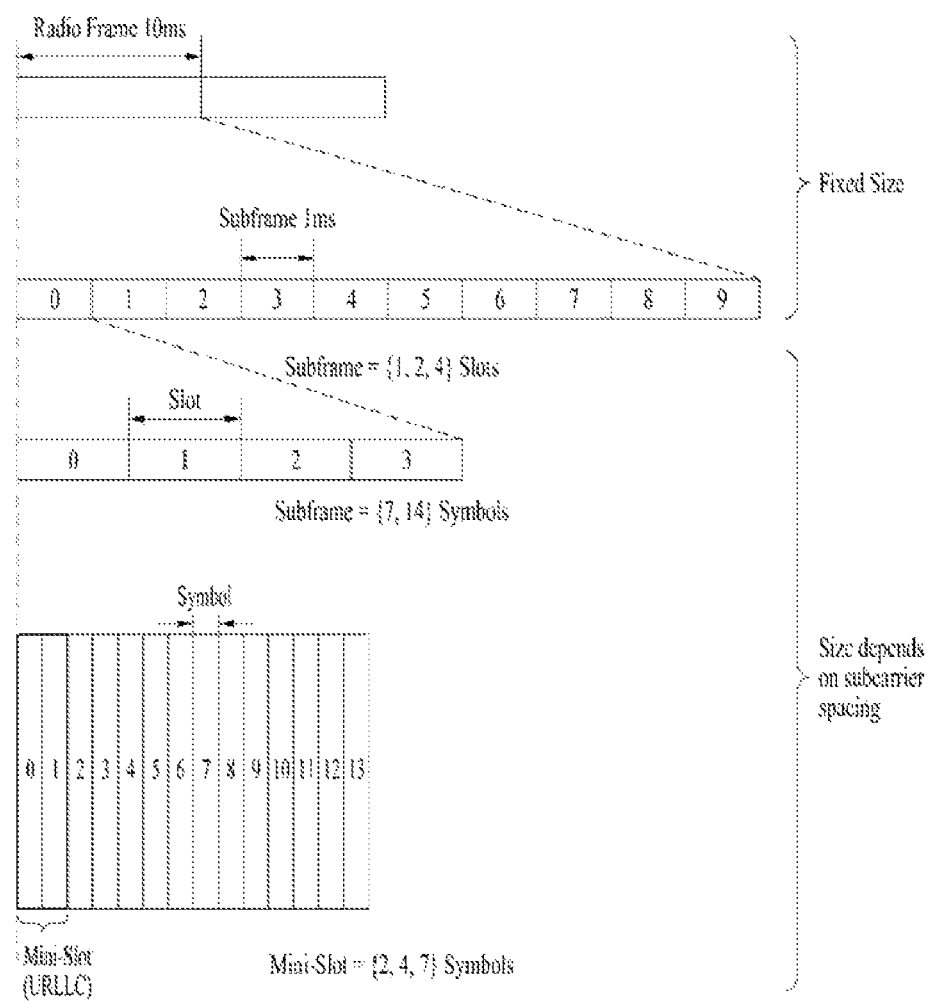
FIG. 2 is a diagram illustrating a frame structure in NR.

FIG. 2 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or μ). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of μ for a bandwidth part and a CP may be obtained by RRC parameters provided by the BS.

TABLE 1

| μ | $\Delta f = 2^\mu * 15$ [kHz] | Cyclic prefix(CP) |
|---|---|---|
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

An NR frequency band may be defined by two types of frequency ranges, FR1 and FR2. FR1 may be a "sub 6 GHz range" and FR2 may be an "above 6 GHz range" called millimeter wave (mmW).

Table 2 below illustrates the definition of the NR frequency band.

TABLE 2

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

Regarding a frame structure in the NR system, the time-domain sizes of various fields are defined as multiples of a basic time unit for NR, $T_c=1/(\Delta f_{max}*N_f)$ where $\Delta f_{max}=480*10^3$ Hz and the value of $N_f$ related to a fast Fourier transform (FFT) size or an inverse fast Fourier transform (IFFT) size is given by $N_f=4096$. $T_c$ and $T_s$ have the following relationship: $T_s/T_c=64$, where $T_s$ is an LTE-based time unit and sampling time and is given by $T_s=1/((15 \text{ kHz})*2048)$. DL and UL transmissions are organized into (radio) frames, each of which has a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may be one set of UL frames and one set of DL frames. For a numerology μ, slots are numbered by $n^\mu_s \in \{0, \ldots, N^{slot,\mu}_{frame}-1\}$ in ascending order within a subframe, and slots are numbered by $n^\mu_{s,f} \in \{0, \ldots, N^{slot,\mu}_{frame}-1\}$ in ascending order within a radio frame. One slot includes $N^\mu_{symb}$ consecutive OFDM symbols, and $N^\mu_{symb}$ depends on CPs. The start of a slot $n^\mu_s$ in a subframe is aligned in time with the start of an OFDM symbol $n^\mu_s * N^\mu_{symb}$ in the same subframe. Table 3 shows the number of symbols in each slot, the number of slots in each frame, and the number of slots in each subframe depending on subcarrier spacings (SCSs) in the case of a normal CP. Table 4 shows the number of symbols in each slot, the number of slots in each frame, and the number of slots in each subframe depending on SCSs in the case of an extended CP.

TABLE 3

| μ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |

TABLE 3-continued

| μ | $N^{slot}_{symb}$ | $N^{frame, \mu}_{slot}$ | $N^{subframe, \mu}_{slot}$ |
|---|---|---|---|
| 3 | 14 | 80 | 8 |
| 4 | 14 | 160 | 16 |

TABLE 4

| μ | $N^{slot}_{symb}$ | $N^{frame, \mu}_{slot}$ | $N^{subframe, \mu}_{slot}$ |
|---|---|---|---|
| 2 | 12 | 40 | 4 |

FIG. 2 shows a case in which μ=2 (i.e., an SCS of 60 kHz). Referring to Table 3, one subframe may include four slots. One subframe={1, 2, 4} slots shown in FIG. 2, which is exemplary, and the number of slot(s) included in one subframe may be defined as listed in Table 3 or Table 4.

Further, a mini-slot may include 2, 4 or 7 symbols, fewer symbols than 2, or more symbols than 7.

In the NR system, an antenna port, a resource grid, a resource element, a resource block, a carrier part, etc. may be considered as physical resources. Hereinafter, the physical resources considerable in the NR system will be described in detail.

First, an antenna port may be defined such that a channel conveying symbols on the antenna port is capable of being inferred from a channel conveying other symbols on the same antenna port. When the large-scale properties of a channel carrying symbols on one antenna port are inferred from a channel carrying symbols on another antenna port, the two antenna ports may be said to be in quasi co-located or quasi co-location (QC/QCL) relationship. The large-scale properties may include at least one of the following parameters: delay spread, Doppler spread, frequency shift, average received power, received timing, average delay, and spatial reception (Rx). The spatial Rx parameter refer to a spatial (Rx) channel characteristic parameter such as angle of arrival.

Figure 3:
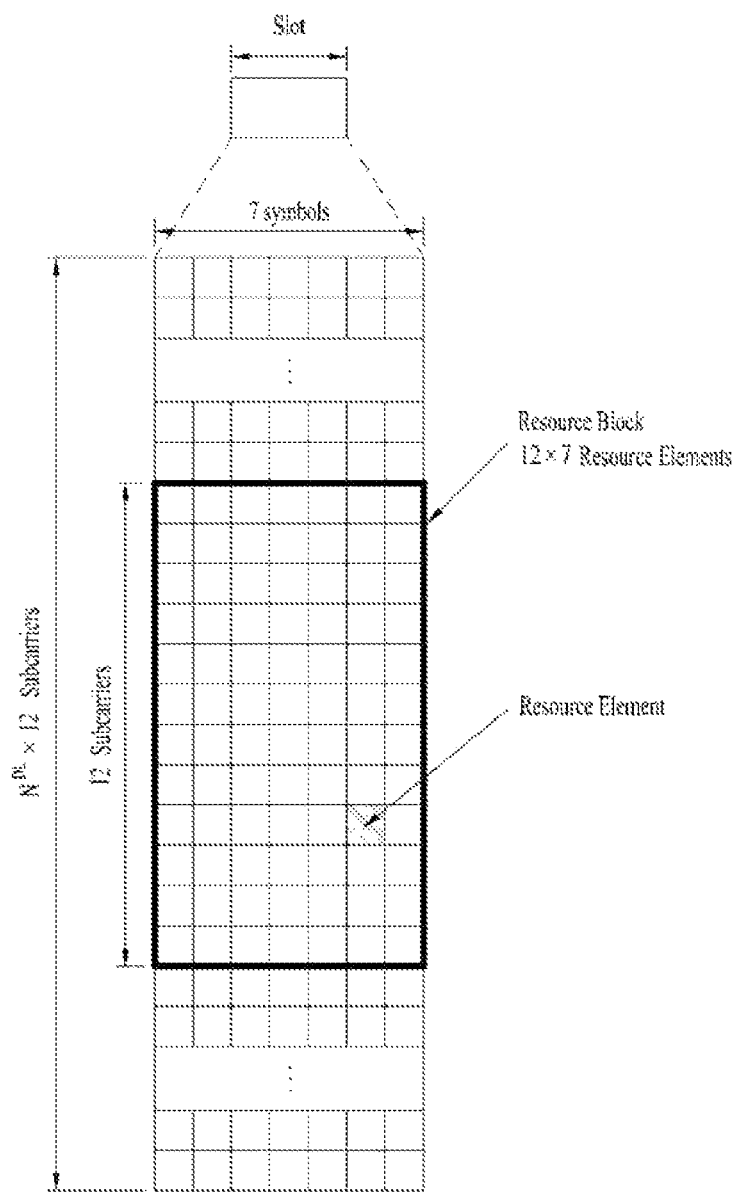
FIG. 3 is an exemplary diagram illustrating a resource grid of NR.

FIG. 3 illustrates a resource grid in the NR system.

Figure 4:
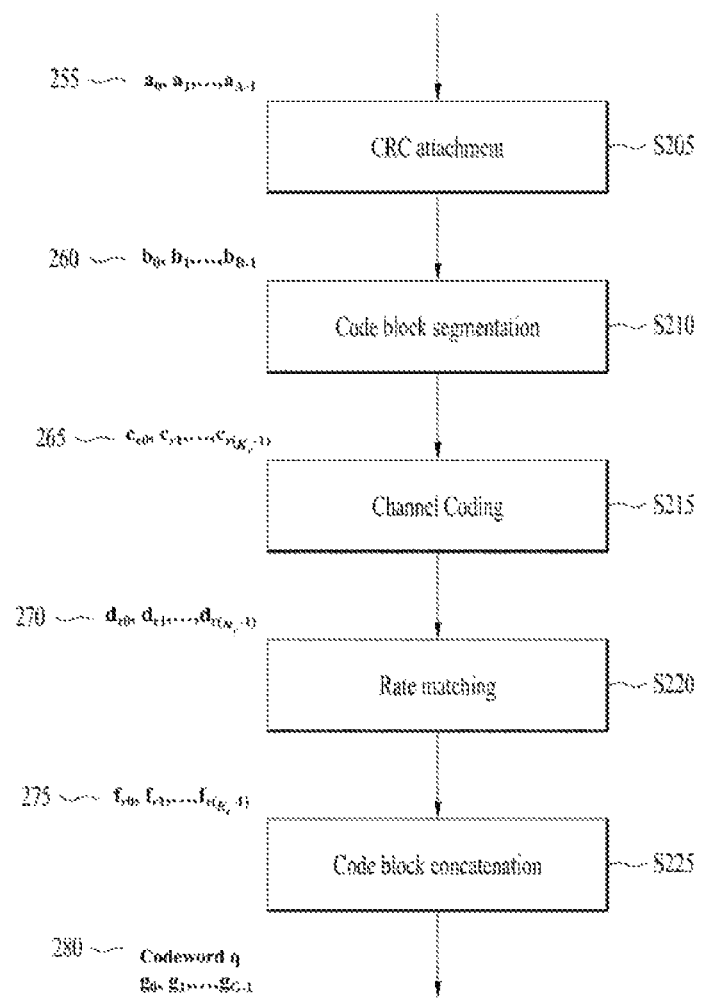
FIG. 4 is an exemplary diagram for explaining a channel coding method according to the present disclosure.

Referring to FIG. 3, a resource grid includes $N_{RB}^\mu N_{sc}^{RB}$ subcarriers in the time domain, and one subframe 14·2μ OFDM symbols, which is exemplary and thus should not be construed as limiting the disclosure. In the NR system, a transmitted signal is described by one or more resource grids including $N_{RB}^\mu N_{sc}^{RB}$ subcarriers and $2^\mu N_{symb}^{(\mu)}$ OFDM symbols, where $N_{RB}^\mu \le N_{RB}^{max, \mu}$. $N_{RB}^{max, \mu}$ represents a maximum transmission bandwidth, which may be different for UL and DL as well as according to numerologies. In this case, one resource grid may be configured for each neurology μ and each antenna port p, as illustrated in FIG. 4. Each element of the resource grid for the numerology μ and the antenna port p is referred to as an RE, which is uniquely identified by an index pair (k, l̄) where k=0, . . . , $N_{RB}^\mu N_{sc}^{RB}-1$ is a frequency-domain index and l̄=0, . . . , $2^\mu N_{symb}^{(\mu)}-1$ indicates the position of a symbol in a subframe. An RE in a slot is indicated by an index pair (k,l) where l=0, . . . , $N_{symb}^\mu=1$. An RE (k,l̄) for the numerology μ and the antenna port p corresponds to a complex value $a_{k,l̄}^{(p,\mu)}$. When there is no risk of confusion or a specific antenna port or a numerology is not specified, the indexes p and μ may be dropped, and as a result, the complex value may be $a_{k,l̄}^{(p)}$ or $a_{k,l̄}$. In addition, an RB is defined as $N_{sc}^{RB}=12$ consecutive subcarriers in the frequency domain.

Considering that a UE may be incapable of supporting a wide bandwidth supported in the NR system, the UE may be configured to operate in a part of the frequency BW of a cell (hereinafter referred to as a bandwidth part (BWP)).

In the NR system, resource blocks may be divided into physical resource blocks defined within the BWP and common resource blocks numbered from 0 upward in the frequency domain for an SCS configuration μ.

Point A is obtained as follows.

For a PCell downlink, offsetToPointA represents the frequency offset between point A and the lowest subcarrier of the lowest resource block overlapping with an SS/PBCH block used by the UE for initial cell selection, which is expressed in units of resource blocks on the assumption of an SCS of 15 kHz for FR1 and an SCS of 60 kHz for FR2.

For other cases, absoluteFrequencyPointA represents the frequency location of point A expressed as in the absolute radio-frequency channel number (ARFCN).

The center of subcarrier 0 of common resource block 0 for the SCS configuration μ coincides with point A, which act as the reference point for resource grids. The relationship between a common resource block number $n^\mu_{CRB}$ in the frequency domain and a resource elements (k,l) for the SCS configuration μ is given by Equation 1.

$$n^\mu_{CRB} = \left\lfloor \frac{k}{N_{sc}^{RB}} \right\rfloor \qquad \text{[Equation 1]}$$

In Equation 1, k is defined relative to point A such that k=0 corresponds to a subcarrier around point A. Physical resource blocks are numbered from 0 to $N^{size}_{BWP,i}-1$ within the BWP, where i is the number of the BWP. The relationship between a physical resource block $n_{PRB}$ and a common resource block $n_{CRB}$ in BWP i is given by Equation 2.

$$n_{CRB} = n_{PRB} + N_{BWP,i}^{start} \qquad \text{[Equation 2]}$$

In Equation 2, $N^{start}_{BWP,i}$ is a common resource block where the BWP starts relative to common resource block 0.

FIG. 4 is a diagram for explaining a channel coding method according to the present disclosure.

Data subject to channel coding is referred to as a transport block. Typically, depending on the performance of channel coding, the transport block is divided into code blocks, each of which has a size less than or equal to a predetermined value. For example, in turbo coding of 3GPP TS 36.212, the code block may have a maximum size of 6144 bits. In low density parity check (LDPC) coding of 3GPP TS 38.212, the code block may have a maximum size of 8448 bits (in base graph 1) or 3840 bits (in base graph 2). In polar coding, the code block may have a minimum size of 32 bits and a maximum size of 8192 bits. The code block may be subdivided into sub-blocks. In polar coding methods according to the present disclosure, an input bit sequence (265) ($c_{r0}$, $c_{r1}$, . . . , $c_{r(Kr-1)}$) is interleaved, the interleaved input bit sequence (not shown in the drawing) ($c'_{r0}$, $c'_{r1}$, . . . , $c'_{r(Kr-1)}$) may be encoded based on polar codes. The encoded bit sequence (270) ($d_{r0}$, $d_{r1}$, . . . , $d_{r(Nr-1)}$) may be rate matched. The rate matching of the encoded bit sequence (270) may include: subdividing the encoded bit sequence into sub-blocks; interleaving each of the sub-blocks; performing bit selection for each of the interleaved sub-blocks; and interleaving coded bits again. The bit selection for each of the interleaved sub-blocks may include repeating, puncturing, or shortening some bits.

The channel coding method according to the present disclosure may include attaching a cyclic redundancy check (CRC) code to a transport block (S205); dividing the transport block into code blocks (S210); encoding the divided code blocks (S215); perform rate matching of the encoded code blocks (S220); and concatenating the rate-matched code blocks (S225).

In step S205, party bits with a length of L are attached to the transport block (255) ($a_0, \ldots, a_{A-1}$). The length L may be any one of 6, 11, 16, and 24. Typically, cyclic generator polynomials are used to generate party bits. In addition, scrambling operation may be applied to output bits (260) ($b_0, \ldots, b_{B-1}$), which depend on the CRC attachment, with a radio network temporary identifier (RNTI). Exclusive OR (EOR) operation may be applied between a scrambling sequence and corresponding bits based on the scrambling operation.

The output bits (260) ($b_0, \ldots, b_{B-1}$) depending on the CRC attachment may be segmented into code blocks (265) according to code block sizes. This is called code block segmentation. The code block sizes are determined by channel coding methods. A code block size suitable for each channel coding method may be determined theoretically or experimentally. For example, the segmented code blocks (265) ($c_{r0}, \ldots, c_{r(Kr-1)}$) may be encoded as encoded bits (270) ($d_{r0}, \ldots, d_{r(Nr-1)}$), respectively.

The encoded bits (270) ($d_{r0}, \ldots, d_{r(Nr-1)}$) are generated by applying channel coding to the code blocks (265) ($c_{r0}, \ldots, c_{r(Kr-1)}$) (S215). The generated encoded bits (270) may be rate-matched by shortening and puncturing. Alternatively, the encoded bits (270) may be rate-matched by sub-block interleaving, bit selection, and/or interleaving. That is, the encoded bits (270) ($d_{r0}, \ldots, d_{r(Nr-1)}$) are converted into rate matched bits (275) ($f_{r0}, \ldots, f_{r(gr-1)}$) (S220). Typically, interleaving may refer to a process for changing a sequence of bits and reduce the occurrence of errors. The interleaving is designed in consideration of efficient de-interleaving.

Sub-block interleaving may mean a process for dividing a code block into a plurality of sub-blocks (e.g., 32 sub-blocks) and allocating bits based on the sub-block interleaving.

The bit selection may mean a process for increasing a bit sequence by repeating bits based on the number of bits to be rate-matched or decreasing the bit sequence based on shortening, puncturing, etc. The interleaving may mean a process for interleaving encoded bits after the bit selection.

In another example of the present disclosure, the rate matching may include the bit selection and interleaving. The sub-block interleaving is not mandatory.

After interleaving the encoded bits, code block concatenation is applied to concatenate the code blocks (275) so that a codeword (285) ($g_0, \ldots, g_{G-1}$) may be generated (S225). The generated codeword 280 may be equivalent to one transport block.

Figure 5:
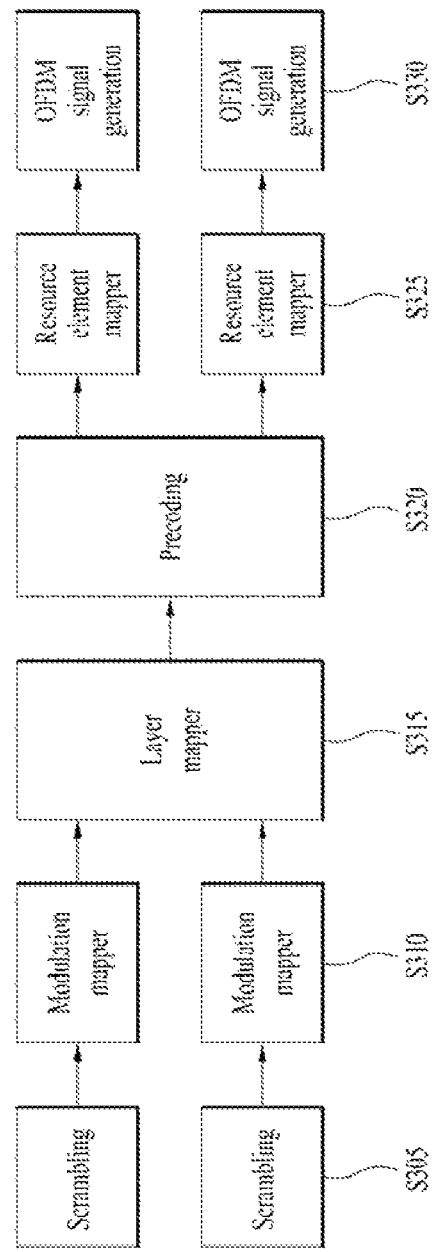
FIGS. 5 and 6 are exemplary diagrams for explaining a modulation method according to the present disclosure.
Figure 6:
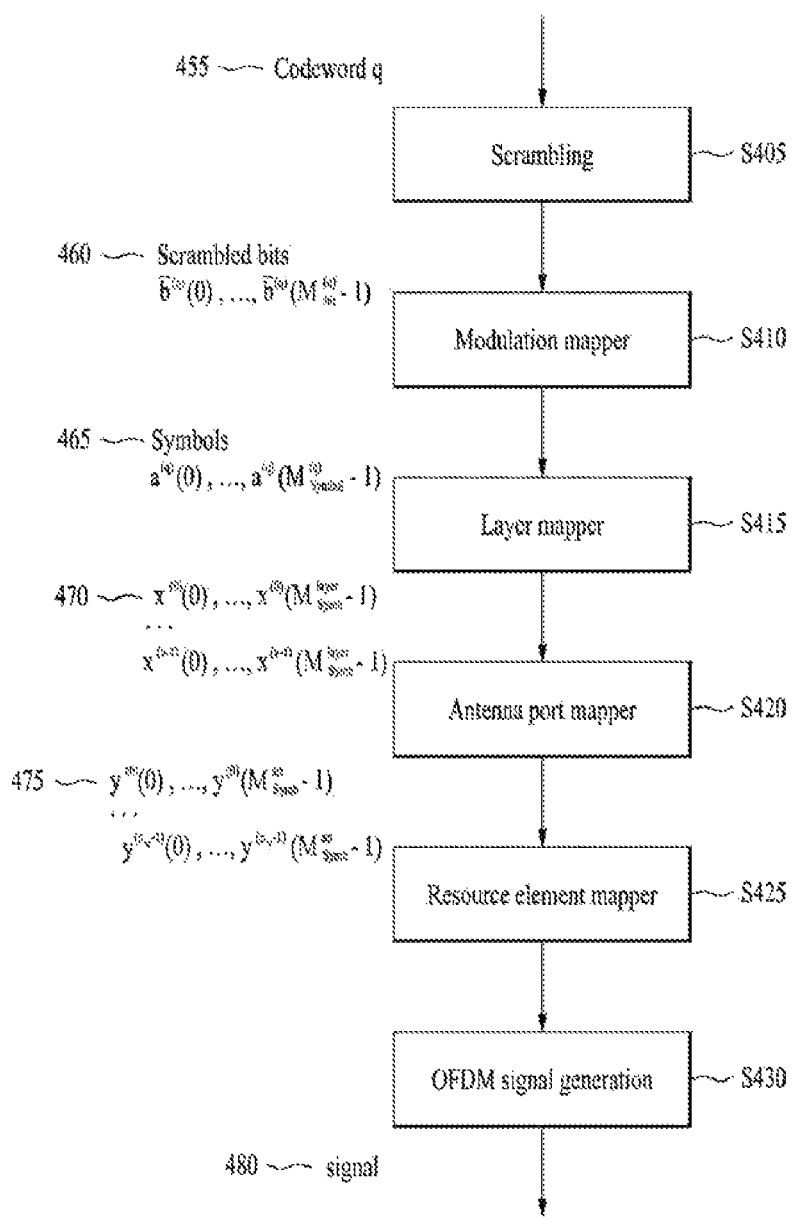

FIGS. 5 and 6 are diagrams for explaining a modulation method according to the present disclosure.

Referring to FIGS. 5 and 6, one or more codewords are input and scrambled (S305 and S405). For example, scrambling may be performed based on EOR operation between an input bit sequence and a predetermined bit sequence. The scrambled bits are modulated (S310 and S410), and the modulated symbols are mapped to layers (S315 and S415). The symbols mapped to the layers are precoded for antenna port mapping. The precoded symbols are mapped to resource elements (S325 and S425). The mapped symbols are generated as OFDM signals (S330 and S430) and transmitted through antennas.

Figure 7:
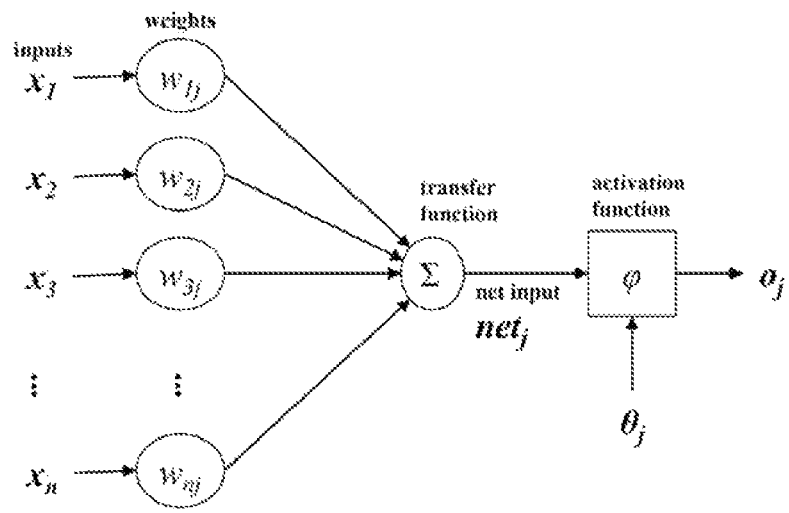
FIG. 7 is a diagram for explaining a backpropagation method in a neural network.

FIG. 7 is a diagram for explaining a backpropagation method in a neural network.

To update the weights of a neural network, backpropagation may be performed.

In a backpropagation model, the error function is defined by E=L(y, t), and the weight is applied to an output $o_k$ to obtain an input (input, $net_j$) of the neural network.

If a neuron is in the first layer after the input layer, $o_k$ of the input layer may simply be an input to the network, $x_k$.

Figure 8:
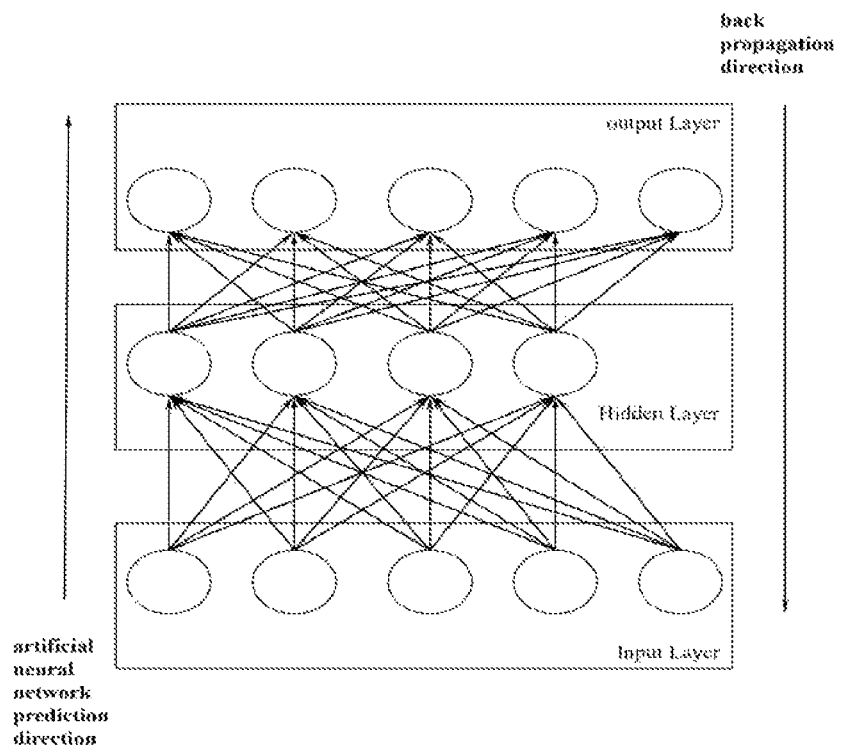
FIG. 8 is an exemplary diagram illustrating a prediction method of an artificial neural network (ANN).

Referring to FIG. 8, $o_j$ may be defined as shown in Equation 3.

$$o_j = \varphi(net_j) = \varphi\left(\sum_{k=1}^{n} w_{kj} o_k\right) \quad \text{[Equation 3]}$$

Referring to FIG. 8, the error function E may satisfy Equation 4.

$$\frac{\partial E}{\partial w_{ij}} = \frac{\partial E}{\partial o_j}\frac{\partial o_j}{\partial w_{ij}} = \frac{\partial E}{\partial o_j}\frac{\partial o_j}{\partial net_j}\frac{\partial net_j}{\partial w_{ij}} \quad \text{[Equation 4]}$$

$$\triangleright \frac{\partial net_j}{\partial w_{ij}} = \frac{\partial}{\partial w_{ij}}\left(\sum_{k=1}^{n} w_{kj} o_k\right) = \frac{\partial}{\partial w_{ij}}(w_{ij} o_i) = o_i$$

$$\triangleright \frac{\partial o_j}{\partial net_j} = \frac{\partial \varphi(net_j)}{\partial net_j}$$

$\triangleright \frac{\partial E}{\partial o_j}$ :E as a function with the inputs being all neurons, $L = \{u, v, w, \ldots\}$ receiving from input neurons $j$ $\rightarrow$ If $o_j$ is an output neuron, $\frac{\partial E}{\partial o_j} = \frac{\partial E}{\partial y} = \frac{\partial L(y, t)}{\partial y}$ $$\rightarrow \frac{\partial E}{\partial o_j} = \sum_{l \in L}\left(\frac{\partial E}{\partial net_l}\frac{\partial net_l}{\partial o_j}\right)$$

$$= \sum_{l \in L}\left(\frac{\partial E}{\partial o_l}\frac{\partial o_l}{\partial net_l}\frac{\partial net_l}{\partial o_j}\right)$$

$$= \sum_{l \in L}\left(\frac{\partial E}{\partial o_l}\frac{\partial o_l}{\partial net_l} w_{jl}\right)$$

$$\rightarrow \frac{\partial E}{\partial w_{ij}} = \frac{\partial E}{\partial o_j}\frac{\partial o_j}{\partial net_j} o_i = \delta_j o_i$$

FIG. 8 is an exemplary diagram illustrating a prediction method of an artificial neural network (ANN)

The ANN includes an input layer including the first input data and an output layer including the last output data and includes a hidden layer as an intermediate layer for calculating the output data from the input data. One or more hidden layers are present in the ANN. The ANN including two or more hidden layers is called a deep neural network (DNN). Actual calculation is performed at a node existing in each layer, and each node may perform calculation based on an output value of another node connected by a connecting line.

As illustrated in FIG. 8, in principle, input data does not affect each other and nodes belonging to the same layer do not affect each other. Each layer exchanges data as an input value or an output value only with a node of an upper or lower adjacent layer.

While, in FIG. 8, connecting lines are connected between all nodes of layers, connecting lines may not be present between nodes belonging to each adjacent layer if necessary. However, when there are no connecting lines, a weight of a corresponding input value may be set to 0.

When a result value of an output layer is predicted from an input layer according to the prediction direction of the ANN, an input value may be predicted from result values in a learning process. In a general ANN, since an input value and an output value do not have a one-to-one correspondence, it is impossible to recover the input layer by use of the output layer. However, if input data calculated from a result value of a back-propagation algorithm considering a prediction algorithm is different from the first input data, since the prediction of the ANN may be considered inaccurate, learning may be performed by changing a prediction coefficient such that input data calculated under a constraint condition is similar to the first input data.

1. MIMO Reference Signal (RS)

1-1. Demodulation Reference Signal (DMRS)

A DMRS of NR is characteristically transmitted only when necessary to enhance network energy efficiency and ensure forward compatibility. The time domain density of the DMRS may vary according to the speed or mobility of a UE. The density of the DMRS may be increased in the time domain in order to track fast change of a radio channel in NR.

(1) DL DMRS-related operation

A DMRS-related operation for PDSCH transmission/reception will now be described.

ABS transmits DMRS configuration information to the UE. The DMRS configuration information may refer to a DMRS-DownlinkConfig information element (IE). The DMRS-DownlinkConfig IE may include a dmrs-Type parameter, a dmrs-AdditionalPosition parameter, a maxLength parameter, and a phaseTrackingRS parameter. The 'dmrs-Type' parameter is a parameter for selecting a DMRS type to be used on DL. In NR, the DMRS may be divided into two configuration types: (1) DMRS configuration type 1 and (2) DMRS configuration type 2. DMRS configuration type 1 has a higher RS density in the frequency domain, and DMRS configuration type 2 has more DMRS antenna ports. The 'dmrs-AdditionalPosition' parameter is a parameter indicating the position of an additional DMRS on DL. The 'maxLength' parameter is a parameter indicating the maximum number of OFDM symbols for a DL front-loaded DMRS. The 'phaseTrackingRS' parameter is a parameter for configuring a DL phase tracking reference signal (PTRS).

In the DMRS, the first position of the front-loaded DMRS is determined according to a PDSCH mapping type (type A or type B), and an additional DMRS may be configured to support the UE of a high speed. The front-loaded DMRS occupies one or two consecutive OFDM symbols and is indicated by RRC signaling and DCI.

The BS generates a sequence used for the DMRS based on the DMRS configuration (S120). The BS maps the generated sequence to resource elements (S130). Here, the resource element may include at least one of time, frequency, an antenna port, or a code.

The BS transmits the DMRS to the UE on the resource elements. The UE receives a PDSCH using the received DMRS.

(2) UL DMRS-related operation

A DMRS-related operation for PUSCH reception will now be described.

A UL DMRS-related operation is similar to the DL DMRS-related operation, and names of DL-related parameters may be replaced with names of UL-related parameters. For example, the DMRS-DownlinkConfig IE may be replaced with a DMRS-UplinkConfig IE, the PDSCH mapping type may be replaced with a PUSCH mapping type, and the PDSCH may be replaced with a PUSCH. In the DL DMRS-related operation, the BS may be replaced with the UE and the UE may be replaced with the BS.

Sequence generation for a UL DMRS may be defined differently according to whether transform precoding is enabled. For example, upon using cyclic prefix orthogonal frequency division multiplexing (CP-OFDM) (i.e., when transform precoding is not enabled), the DMRS uses a pseudo-noise (PN) sequence. Upon using discrete Fourier transform-spread-OFDM (DFT-s-OFDM) (i.e., when transform precoding is enabled), the DMRS uses a Zadoff-Chu (ZC) sequence with a length of 30 or more.

2. Limitations of State-of-the-Art MIMO Detector

Before describing the content of the present disclosure, a state-of-the-art MIMO detector will be described in brief. As a linear operation-based MIMO detector widely used in a practical environment, there are a zero-forcing (ZF) detector and a minimum mean squared error (MMSE) detector. However, performance of these two detectors is suboptimal, and there is a big disadvantage that performance deteriorates as the number of antennas and users increases and complexity of matrix inversion operation increases. Nonlinear operation-based MIMO detector technology includes sphere decoding (SD), a quick response (QR) decomposition (QRD) M-best algorithm, and an approximate message passing (AMP) algorithm. However, all of these algorithms have disadvantages in terms of implementation or performance. In the case of SD, complexity resulting from an increase in the number of antennas and an increase in a modulation-level increases exponentially, and thus SD is not implementable. In the case of the QRD M-best algorithm, tradeoff between complexity of SD and performance is properly considered by limiting the number of surviving branches of a search space to M. However, in order to obtain comparable performance, the QRD M-best algorithm also has a disadvantage that the number of M should increase linearly with the number of antennas. In addition, there is a disadvantage in that search depth increases by as much as $2 \times 2^{Q/2}$ according to a modulation order Q.

3. Challenge Point When Deep-Learning is Applied to MIMO Detector

Deep-learning (DL) is a good tool that may easily handle nonlinear characteristics by parallel processing. In general, DL is very useful for classifying different inputs. However, in a wireless communication environment, a variation factor called a channel exists, and it is not easy to overcome this variation with a naive approach. For example, although implementation of a DL-based MIMO detector for a given channel may be simply applied, it is not possible to distinguish between transmitted sequences because a decision boundary is very different depending on the channel in a channel-varying situation. Simply, as a straightforward method, when weight matrices and bias vectors constituting a DNN structure are updated through training according to instantaneous channel variation, a DNN with near-optimal performance in a corresponding channel may be designed. However, it is not easy to apply this structure to a real system. This is because control overhead and training cost (latency and complexity required for training) generated in a training phase are very large. Accordingly, a DL-based MIMO detector that overcomes offline-learning-based channel variation is required, and the present disclosure describes relevant content.

4. Reason Why Supervised DL is Applied to MIMO Detector Among Machine Learning Methods A machine learning algorithms are largely classified into three types: supervised learning, unsupervised learning, and reinforcement learning. Supervised learning is a method of learning in a state in which a label (an explicit correct answer) for data is given and aims at accurate prediction (discrete value prediction or classification). Unsupervised learning is a form of learning only from data without labels and aims to discover hidden features of data. Reinforcement learning is a method of taking an action in a given environment and learning based on a reward according to the action. Therefore, reinforcement learning aims to determine a strategy in a dynamic state.

Due to the nature of communication, a receiving end requires accurate prediction of data transmitted by a transmitting end. Therefore, unsupervised learning is not suitable to solve an issue of the MIMO detector. In addition, although reinforcement learning aims to establish a strategy in a dynamic environment, reinforcement learning is also not suitable because a problem currently focused on in the present disclosure aims to well predict a data stream from each snapshot while statistical characteristics of a channel do not vary. Therefore, supervised learning is most suitable.

A neural network core used as a learning scheme broadly includes a DNN, a recurrent neural network (RNN), and a convolutional neural network (CNN).

The RNN is a scheme for basically modeling sequential data. The RNN easily predicts current data based on previous data by understanding sequence data using a state or memory and is very useful for natural language processing. However, a data stream dealt with in the present disclosure is not appropriate for the RNN because the data stream does not have a sequential property.

The CNN is defined in the spatial domain and is a scheme suitable for data, images, or videos with correlation characteristics according to proximity. The CNN is a scheme of effectively recognizing and emphasizing features with adjacent images while maintaining spatial information of images and includes a part that extracts features of an image and a part that classifies an image. The part that extracts features of an image includes a convolutional layer that finds features of an image while minimizing the number of shared parameters using a filter and a pooling layer that enhances and collects features of an image. The CNN adjusts the size of output data by filter size, stride, padding, and pooling size. The reduction in the number of parameters to learn is a big advantage, whereas data should be defined in the spatial domain and have correlation characteristics according to proximity as mentioned above.

In general, the DNN has a fully connected neural network structure and is composed of a combination of a plurality of hidden layers and activation functions. The DNN is a tool that easily discerns correlation characteristics between input and output. Here, the correlation characteristics mean a joint probability of input and output. The MIMO detector in the present disclosure is also the same as a problem of solving the joint probability of input and output, so it is appropriate to apply the DNN.

The present disclosure describes a proposed DNN-based preprocessor MIMO detector. Prior to description, the following notations are defined.

Notations: A regular character denotes a scalar, a bold lowercase character and uppercase character denote a vector and a matrix, respectively, and a calligraphic character denotes a set. For example, x, X, X and $\mathcal{X}$ denote a scalar, a vector, a matrix, and a set, respectively. |x| and $\|x\|_2$ denote cardinality and $l_2$-norm of a vector and $v(X)$ denotes conversion into a vector having a length mn from a m*n matrix x. $(x)_+=[\max(x_i, 0)]_{i=1}^{|x|}$ denotes an element-wise rectified linear unit (ReLU) function, $$\sigma(x) = \left[\frac{1}{1+e^{-x_i}}\right]_{i=1}^{|x|}$$

denotes an element-wise sigmoid function, and $(x)_{0.5}=[H_d(x_i, 0.5)]_{i=1}^{|x|}$ ($H_d(x_i, 0.5)=1$ if $x_i \geq 0.5$ or 0 else) denotes an element-wise hard decision function.

5-1. Main Concept of DNN-Based Preprocessor-Aided MIMO Detector

This section describes the concept of a proposed DNN-based preprocessor-aided MIMO detector. The aforementioned weight adaptation scheme changes a DNN structure according to channel variation and is consistent with an equalizer that designs and processes an adaptive filter according to a channel in a general communication system. However, a general linear operation-based adaptive filter scheme may simply design the adaptive filter using channel observation (predicted channel), whereas the weight adaptation scheme is a data driven approach that requires many transmitted sequences for learning and thus needs a large amount of learning overhead. In addition, since weight matrices and bias vectors constituting the DNN structure are relatively bulky and dense, a lot of computational complexity is required to update the matrices and vectors.

Figure 9:
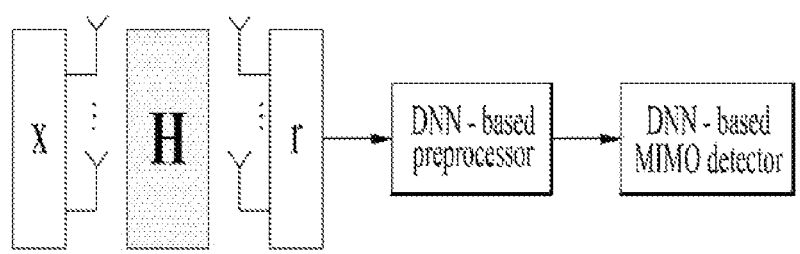
FIG. 9 is an exemplary diagram illustrating a DNN-based preprocessor-aided MIMO detector according to the present disclosure.

FIG. 9 is an exemplary diagram illustrating a DNN-based preprocessor-aided MIMO detector according to the present disclosure.

The proposed DNN-based preprocessor-aided MIMO detector is as illustrated in FIG. 9 and has opposite characteristics to the above general schemes. Simply, the DNN-based preprocessor-aided MIMO detector is an observation adaptation+fixed filter scheme in which observation adaptation serves as a preprocessor and the fixed filter serves as a MIMO detector composed of a fixed neural network. Here, the preprocessor performing observation adaptation also uses a fixed network regardless of channel variation. However, a received signal and channel information, varied by a channel, are used as input of the preprocessor, so that observation adaptation occurs naturally.

The proposed DNN-based preprocessor-aided MIMO detector has two approaches depending on the domain ($N_r$ or $N_t$ domain) that handles the received signal.

5-2. Reference Channel Approach of $N_r$-Dimensional Domain

Figure 10:
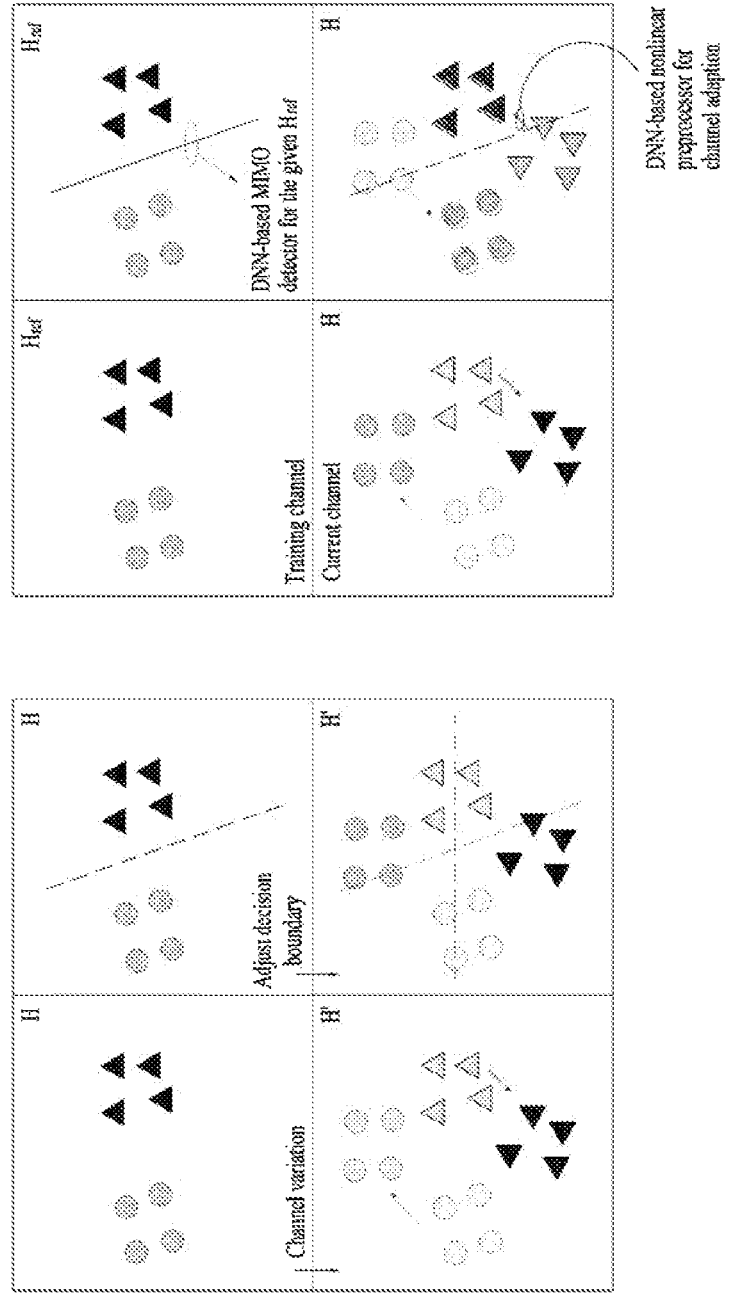
FIG. 10 is an exemplary diagram illustrating a high-level concept of a DNN-based preprocessor-aided MIMO detector in an $N_r$-dimensional domain according to the present disclosure.

The $N_r$-dimensional domain approach serves to perform detection with the same decision boundary as well transforming the received signal as if the received signal undergoes a standard channel $H_{ref}$ irrespective of channel variation. FIG. 10 is a diagram briefly illustrating the $N_r$-dimensional domain approach.

FIG. 10 is an exemplary diagram illustrating a high-level concept of a DNN-based preprocessor-aided MIMO detector in an $N_r$-dimensional domain according to the present disclosure.

This concept may be represented by the following equation.

$$r=Hx+n \rightarrow r^*=H_{ref}x+n \quad \text{[Equation 5]}$$

where H denotes a current channel matrix, X denotes a modulated symbol, and n denotes additive white Gaussian noise. It is assumed that the current channel H is obtained through prediction. A near-optimal MIMO detector may be implemented regardless of channel variation if a received signal that has undergone the actual channel H is reconstructed as a received signal that undergoes the standard channel $H_{ref}$ while maintaining a statistical characteristic of noise. This concept has been obtained based on the following backgrounds.

A DNN-based MIMO detector with near-optimal performance for a given standard channel $H_{ref}$ may be easily obtained.

In order to use a DNN structure designed by offline learning, decision boundaries should be similar regardless of channel variation.

Considering a complexity issue, it is desired to avoid a matrix inverse operation if possible.

The left and right terms of Equation 1 have a non-linear relationship.

Here, observation adaptation of a DNN-based nonlinear preprocessor serves to project a channel from H to $H_{ref}$ while maintaining the statistical characteristic of noise as much as possible. The MIMO detector of a rear end is a MIMO detector optimized for $H_{ref}$. The preprocessor has an unfolding DNN structure and has a structure as illustrated in FIG. 11.

Figure 11:
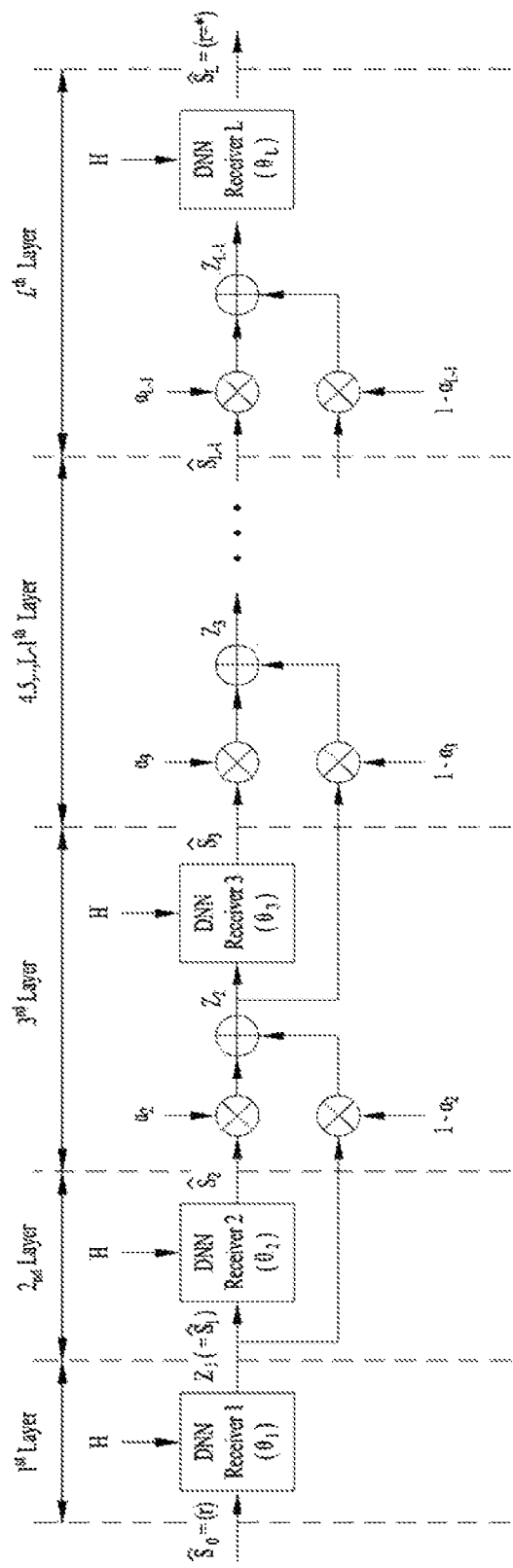
FIG. 11 is an exemplary diagram illustrating a framework of a nonlinear preprocessor according to the present disclosure.

FIG. 11 is an exemplary diagram illustrating a framework of a nonlinear preprocessor according to the present disclosure.

The structure of FIG. 11 is expressed as follows.

$$\hat{s}_i = f([z_{i-1}, v(H)]; \Theta_i) \quad \text{[Equation 6]}$$

$$z_i = \alpha_i \hat{s}_i + (1-\alpha_i)\hat{s}_{i-1} \quad \text{[Equation 7]}$$

where the i-th DNN receiver is composed of $K_i$ layers, which is defined as a parameter $\Theta_i = \{\alpha_i, \{\theta_{i,l}\}_{l=1}^{K_i}\}$ in which $\theta_{i,l} = \{W_{i,l}, b_{i,l}\}$. An activation function of a hidden layer of each receiver is an ReLU function $((\cdot)_+)$, and an output layer transmits a signal without the activation function. This may be expressed as follows.

$$\hat{s}_i = f([z_{i-1}, v(H)]; \Theta_i) = \quad \text{[Equation 8]}$$
$$W_{i,K_i}(\ldots(W_{i,2}(W_{i,1}[z_{i-1}, v(H)] + b_{i,1})_+ + b_{i,2})_+ \ldots)_+ b_{i,K_i}$$

Here, output is a signal obtained by transforming observation of a received signal according to channel variation. The MIMO detector of a rear end is a MIMO detector composed of a general DNN structure and has output of the preceding preprocessor as input, which is expressed as an equation below.

$$\hat{b} = \quad \text{[Equation 9]}$$
$$g(\hat{s}_L; \bar{\Theta}_i) = (\sigma(W_{L_2}(\ldots(W_2(W_1\hat{s}_L + b_1)_+ + b_2)_+ \ldots)_+ + b_{L_2}))_{0.5}$$

This approach is divided into three processes to perform learning. A learning process is as follows.

1) Learning of a DNN parameter of the DNN-based MIMO detector for given $H_{ref}$
2) Learning of a DNN parameter of the DNN-based preprocessor of the nonlinear preprocessor
3) Re-learning of a DNN parameter of the DNN-based MIMO detector During learning in the first process, learning is performed upon a learning sequence with received signals that have undergone the standard channel $H_{ref}$. That is, a learning sequence set $\{H_{ref}x+n\}$ for $x \in \mathbb{X}$ is used as input, and a label uses a binary sequence set $\{b_{label}\}$ for $b_{label} \in \mathbb{B}$. A cost function uses a cross entropy function.

During learning in the second process, the learning sequence set $\{Hx+n\}$ for $x \in \mathbb{X}$ and the current channel H are clearly shown simultaneously as input, and a label $\{s_{label} = H_{ref}x\}$ for $x \in \mathbb{X}$ indirectly indicates the standard channel $H_{ref}$ by showing a noiseless signal that has undergone the standard channel $H_{ref}$. In addition, learning is performed using the MIMO detector of the rear end obtained through previous learning. Output $\hat{s}_L$ of each unfolding DNN receiver of the preprocessor, mean square error (MSE) values of $s_{label}$, a sigmoid function output of the MIMO detector of the rear end, and a weighted sum of a cross entropy with a binary sequence label are defined as the cost function and are used during learning.

In the third process, a DNN parameter of the DNN-based MIMO detector is fine-tuned in a state in which the previously trained DNN-based preprocessor is given. In this case, learning is performed using the output of the previous fixed preprocessor as a learning input set. This process serves to refine a DNN configuration by more precisely reflecting a probability distribution function input to the MIMO detector of the rear end.

5-3. Reference Channel Approach in $N_r$-Dimensional Domain

The approach dealt with in the $N_r$-dimensional domain also aims to perform detection with the same decision boundary regardless of every instantaneous channel variation. In general, a linear filter approach widely known as a method of projecting a received signal of the $N_r$-dimensional domain onto a signal of an $N_r$-dimensional domain includes a ZF scheme or a matched filter (MF) scheme. Either of the two filters may be applied.

Case 1: Use of MF

For a received signal projected onto the $N_r$-dimensional domain using an MF, observation of the received signal is transformed using the DNN-based preprocessor as described above and detection is performed using the DNN-based MIMO detector of the rear end. FIG. 4 is a diagram illustrating the framework of the preprocessor-aided MIMO detector. Here, it is assumed that each DNN receiver has one hidden layer. However, the DNN receiver may be extended in a straightforward way even if the depth of the hidden layer increases.

Figure 12:
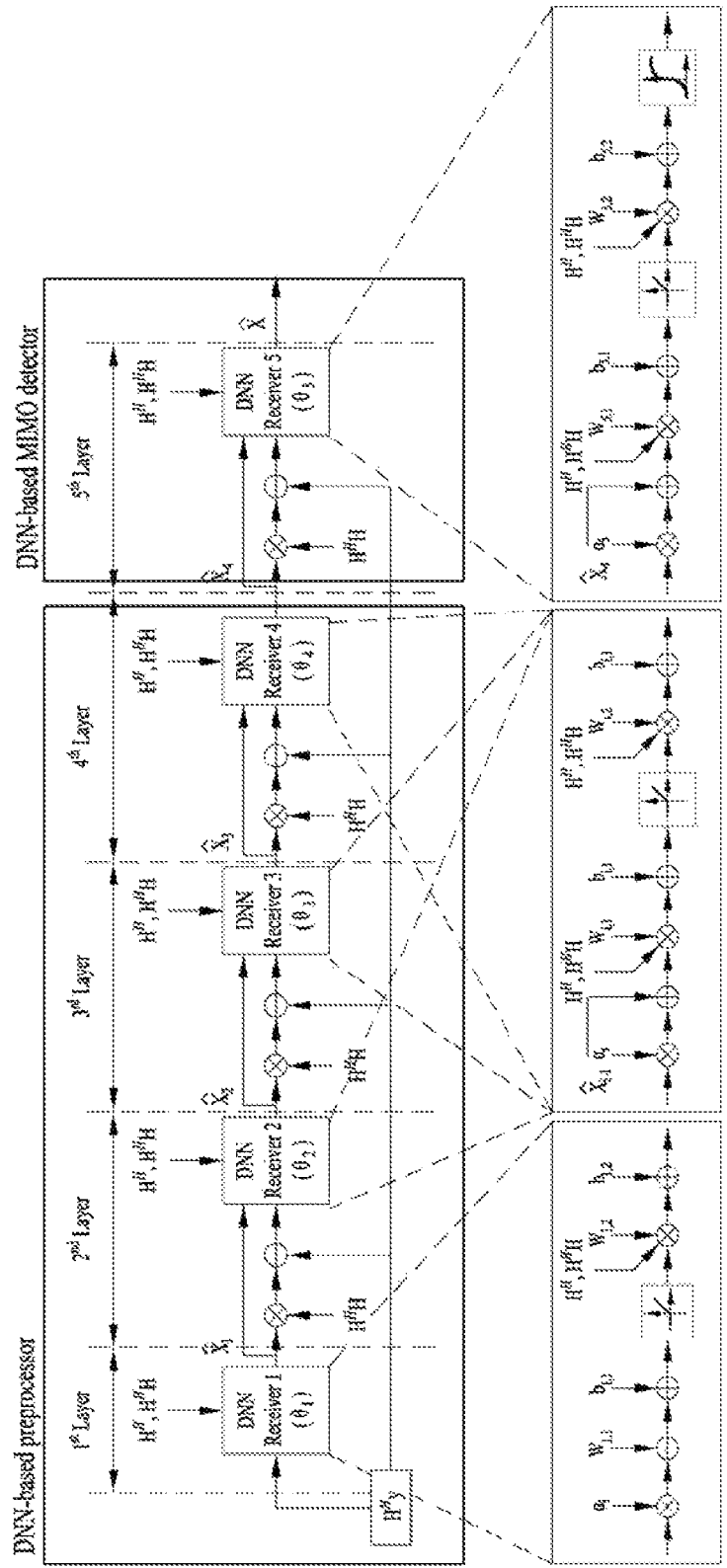
FIG. 12 is an exemplary diagram illustrating a framework of a DNN-based preprocessor-aided MIMO detector according to the present disclosure.

FIG. 12 is an exemplary diagram illustrating a framework of a DNN-based preprocessor-aided MIMO detector according to the present disclosure.

FIG. 12 may be expressed as an equation as follows.

$$z_i = \begin{cases} \alpha_i H^H y, & \text{if } i = 1, \\ \hat{x}_{i-1} + \alpha_i H^H(y - H\hat{x}_{i-1}), & \text{else,} \end{cases} \quad \text{[Equation 10]}$$

$$\hat{x}_i = f_i([z_i, v(H), v(H^H H)]; \{W_{i,1}, W_{i,2}, b_{i,1}, b_{i,2}\}) \quad \text{[Equation 11]}$$

where $f_i(\hat{z}_i; \{W_{i,1}, W_{i,2}, b_{i,1}, b_{i,2}\})$ is as follows.

$$f_i(\hat{z}_i; \{W_{i,1}, W_{i,2}, b_{i,1}, b_{i,2}\}) = \quad \text{[Equation 12]}$$
$$\begin{cases} W_{i,2}(W_{i,1}\hat{z}_i + b_{i,1})_+ + b_{i,2}, & \text{if } i = 1, \ldots, N_L - 1 \\ (\sigma((W_{N_L,1}\hat{z}_i + b_{i,1})_+ + b_{i,2}))_{0.5}, & \text{else if } i = N_L \end{cases}$$

Unlike the above $N_r$-dimensional domain approach, the $N_r$-dimensional domain approach jointly trains the DNN-based preprocessor and the DNN-based MIMO detector. Because an actual data stream and noise undergo $H^H H$ and $H^H$, respectively, and generate a received signal, information of two channels is accurately used as input. In this case, although the width of input is increased, this rather serves to reduce the width of the hidden layer and thus has an effect of improving overall complexity. Although only one of $H^H H^H$ and may be used as input channel information, this configuration has room for the width of the hidden layer to be much larger than an input size. As described above, the cost function uses the weighted sum of the MSE between an intermediate data stream and a sequence label at the preprocessor and a sigmoid function output of the MIMO detector of the rear end.

Case 2: Use of ZF filter

In the case of projection onto the $N_t$-dimensional domain using the ZF filter, this process is almost the same as the above process. The difference is that only input of the preprocessor and the MIMO detector and intermediate input inside the preprocessor are adjusted as follows.

$$z_i = \begin{cases} \alpha_i H^+ y, & \text{if } i = 1, \\ \hat{x}_{i-1} + \alpha_i H^+(y - H\hat{x}_{i-1}), & \text{else,} \end{cases} \quad \text{[Equation 13]}$$

$$\hat{x}_i = f_i([z_i, v(H^+)]; \{W_{i,1}, W_{i,2}, b_{i,1}, b_{i,2}\}) \quad \text{[Equation 14]}$$

Although there is burden for generation of a matrix inverse operation, the width of input is relatively reduced. In this case, there is an effect of reducing the width of input by using $v(H^+)$ instead of $[v(H), v(H^H H)]$.

5-4. Hardware Architecture of DNN-Based MIMO Detector

Hereinafter, a hardware design method for the DNN-based preprocessor-aided MIMO detector based on the above-mentioned $N_t$-dimensional domain approach will be dealt with. A MIMO detector based on the $N_r$-dimensional domain approach may also be implemented in a similar manner.

The DNN-based preprocessor-aided MIMO detector described above may be a combination of multiplication between simple matrices, addition or subtraction of an element-wise vector, an element-wise ReLU function, and an element-wise sigmoid function. Here, most of operations are occupied by a matrix operation, and decoding latency may be greatly reduced by processing the matrix operation in parallel as much as possible.

Figure 13:
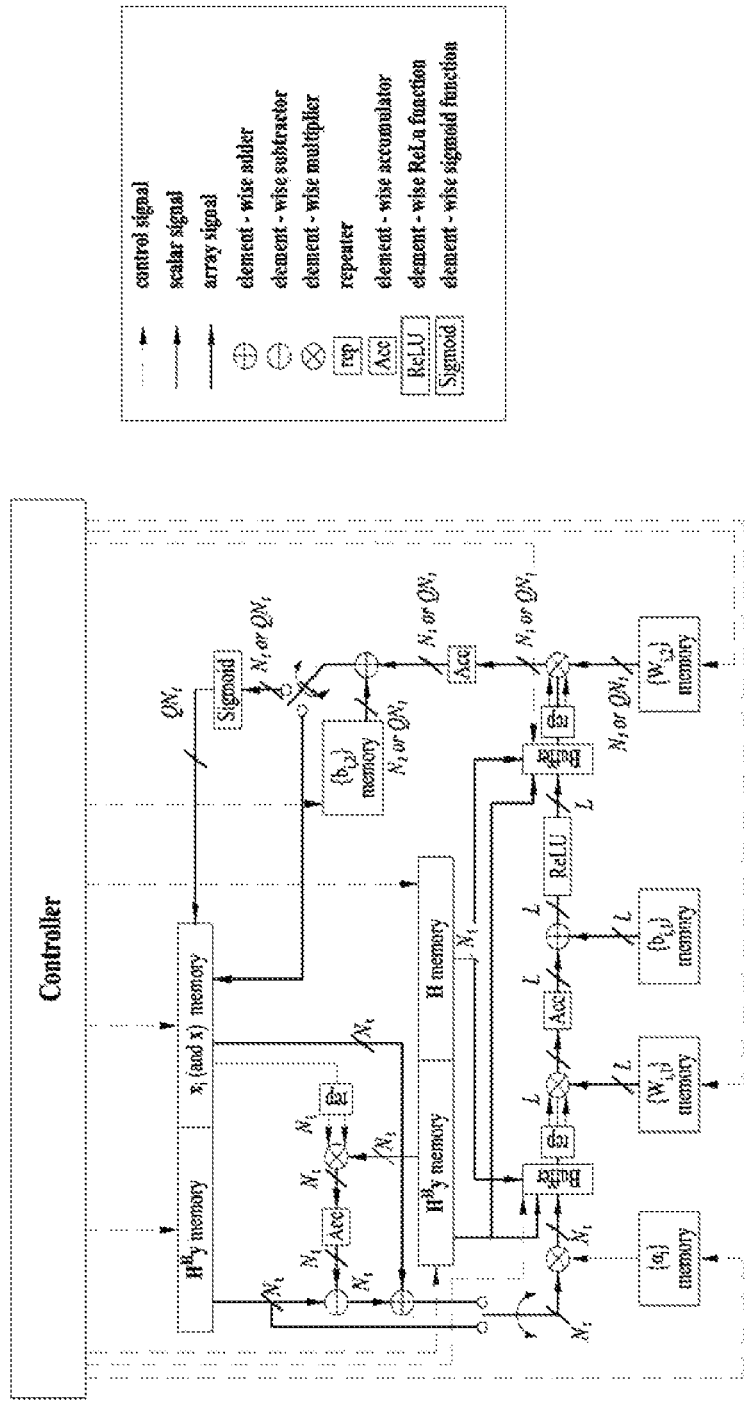
FIG. 13 is an exemplary diagram illustrating a hardware architecture of an Nt-dimensional DNN-based preprocessor-aided MIMO detector according to the present disclosure.

FIG. 13 is an exemplary diagram illustrating a hardware architecture of an Nt-dimensional DNN-based preprocessor-aided MIMO detector according to the present disclosure.

In FIG. 13, Nt denotes a parallel processing unit of a machine learning neural network operation (matrix multiplication, element-wise vector addition/subtraction) in each layer in the Nt-dimensional approach, and Q*Nt shows that a sigmoid function is applied as a nonlinear activation process of the last output layer in the Nt-dimensional domain approach. In addition, FIG. 13 illustrates Equations 10 and 11 as a specific hardware architecture. Referring to FIG. 13, the Nt-dimensional domain approach uses an $H^H H$ memory and an $H^H$ memory because an actual data stream and noise undergo $H^H H$ and $H^H$, respectively, and generate a received signal, and the Nr-dimensional domain approach uses only a current channel H during machine learning and an actual operation because $H_{ref}$ is fixed. However, the machine learning and actual operation may also be performed by simultaneously using $H_{ref}$ and H.

Here, the multiplication operation of a matrix and a vector is calculated by a weighted sum operation of the element-wise multiplication of each of column elements of a matrix and each element of a vector, so that parallel processing may be performed as much as the column size of the matrix. This may be summarized as follows:

$$s = Wx = \begin{bmatrix} w_{1,1} & \cdots & w_{1,n} \\ \vdots & \ddots & \vdots \\ w_{m,1} & \cdots & w_{m,n} \end{bmatrix} \begin{bmatrix} x_1 \\ \vdots \\ x_n \end{bmatrix} = \begin{bmatrix} \sum_{j=1}^n w_{1,j} x_j \\ \vdots \\ \sum_{j=1}^n w_{m,j} x_j \end{bmatrix} \quad \text{[Equation 15]}$$

A method performed by the UE and the BS includes the methods proposed in the present disclosure and combinations thereof by reference.

Through the present disclosure, data detection may be efficiently performed irrespective of channel variation by designing the DNN-based preprocessor-aided MIMO detector.

The aforementioned embodiments are achieved by combination of structural elements and features of the present disclosure in a predetermined manner Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method and apparatus for efficiently operating a MIMO detector based on machine learning is industrially applicable to various wireless communication systems such as a 3GPP LTE/LTE-A system and a 5G communication system.

The invention claimed is:

1. A method performed by an apparatus, the method comprising:
training parameters of a deep neural network (DNN) based MIMO detector by using a training sequence set $\{H_{ref}x+n\}$ for $x \in X$ as input, a binary sequence subset $\{b_{label}\}$ for $b_{label} \in B$ as label, and a cross entropy function as a cost function, where $H_{ref}$ is a standard channel, x is a modulation symbol, X is a modulation symbol set, B is a binary sequence set, and n is additive white Gaussian noise;
training parameters of a DNN based preprocessor to obtain a fixed DNN based preprocessor by using a training sequence set $\{Hx+n\}$ for $x \in X$ as input, and $s_{label} = H_{ref}x$, which is a noiseless signal having undergone $H_{ref}$ as label, where H is a current channel; and fine-tuning the parameters of the DNN based MIMO detector by using output of the fixed DNN based preprocessor as a training input set;
receiving a first channel signal r;
obtaining a second channel signal r* based on the first channel signal r through the fixed DNN based preprocessor trained to transform a signal that has undergone an actual channel into a signal that undergoes the standard channel; and
obtaining a transmitted channel signal from the second channel signal r* through the DNN based MIMO detector trained for the standard channel.

2. An apparatus, the apparatus comprising:
at least one processor; and
at least one computer memory operably connectable to the at least one processor and storing instructions that, when executed, cause the at least one processor to perform operations comprising:
training parameters of a deep neural network (DNN) based MIMO detector by using a training sequence set $\{H_{ref}x+n\}$ for $x \in X$ as input, a binary sequence subset $\{b_{label}\}$ for $b_{label} \in B$ as label, and a cross entropy function as a cost function, where $H_{ref}$ is a standard channel, x is a modulation symbol, X is a modulation symbol set, B is a binary sequence set, and n is additive white Gaussian noise;
training parameters of a DNN based preprocessor to obtain a fixed DNN based preprocessor by using a training sequence set $\{Hx+n\}$ for $x \in X$ as input, and $s_{label} = H_{ref}x$, which is a noiseless signal having undergone $H_{ref}$ as label, where H is a current channel; and
fine-tuning the parameters of the DNN based MIMO detector by using output of the fixed DNN based preprocessor as a training input set;
receiving a first channel signal r;
obtaining a second channel signal r* based on based on the first channel signal r through the fixed DNN based preprocessor trained to transform a signal that has undergone an actual channel into a signal that undergoes the standard channel; and
obtaining a transmitted channel signal from the second channel signal r* through the DNN based MIMO detector trained for the standard channel.

3. A non-transitory computer readable storage medium storing at least one computer program including instructions that, when executed by at least one processor, cause the at least one processor to perform operations comprising:
training parameters of a deep neural network (DNN) based MIMO detector by using a training sequence set $\{H_{ref}x+n\}$ for $x \in X$ as input, a binary sequence subset $\{b_{label}\}$ for $b_{label} \in B$ as label, and a cross entropy function as a cost function, where $H_{ref}$ is a standard channel, x is a modulation symbol, X is a modulation symbol set, B is a binary sequence set, and n is additive white Gaussian noise;
training parameters of a DNN based preprocessor to obtain a fixed DNN based preprocessor by using a training sequence set $\{Hx+n\}$ for $x \in X$ as input, and $s_{label} = H_{ref}x$, which is a noiseless signal having undergone $H_{ref}$ as label, where H is a current channel; and
fine-tuning the parameters of the DNN based MIMO detector by using output of the fixed DNN based preprocessor as a training input set;
receiving a first channel signal r;
obtaining a second channel signal r* through the fixed DNN based preprocessor trained to transform a signal that has undergone an actual channel into a signal that undergoes the standard channel; and
obtaining a transmitted channel signal from the second channel signal r* through the DNN based MIMO detector trained for the standard channel.

* * * * *